Patented Jan. 19, 1954

2,666,765

UNITED STATES PATENT OFFICE 2,666,765

PRODUCTION OF ALKENYLTHIOPHENES

Herman Pines and Bruno Kvetinskas, Chicago, Ill., assignors to Universal Oil Products Company, Chicago, Ill., a corporation of Delaware No Drawing. Application December 10, 1949, Serial No. 132,422

5 Claims. (Cl. 260—329)

This invention relates to a process for producing alkenylthiophenes and particularly for producing a butenylthiophene.

An object of this invention is to produce an alkenylthiophene.

Another object of this invention is to produce a butenylthiophene.

A further object of this invention is to produce (2-thienyl)-2-butene.

One specific embodiment of this invention relates to a process for producing an alkenylthiophene which comprises chloroalkylating a thiophene with a chloro-olefin to form a chloroalkylthiophene, and dehydrochlorinating said chloroalkylthiophene to form an alkenylthiophene.

Another embodiment of this invention relates to a process for producing butenylthiophene which comprises chloroalkylating thiophene with methallyl chloride to form chlorotertiarybutylthiophene and dehydrochlorinating said chlorotertiarybutylthiophene to form butenylthiophene.

A still further embodiment of this invention relates to a process for producing (2-thienyl)-2-butene which comprises reacting thiophene with methallyl chloride in the presence of a boron fluoride-ethylether catalyst to form chlorotertiarybutylthiophene and reacting said chlorotertiarybutylthiophene with sodium hydroxide solution and recovering the resultant (2-thienyl)-2-butene.

We have found that alkenylthiophenes and particularly butenylthiophenes can be obtained by the following sequence of steps, namely (1) chloroalkylation of thiophene in the presence of an acid-acting alkylating catalyst and (2) dehydrochlorination of the resultant chloroalkylthiophene to form an alkenylthiophene. The two steps of this process are illustrated by the following equations which show the production of (2-thienyl)-2-butene by the reaction of methallyl chloride with thiophene itself to form chlorotertiarybutylthiophene which is then reacted with aqueous sodium hydroxide solution to remove hydrogen chloride and yield butenylthiophene in which the carbon atom of the substituent group rearranges to a stable butenyl radical.

(1) 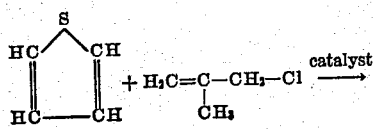

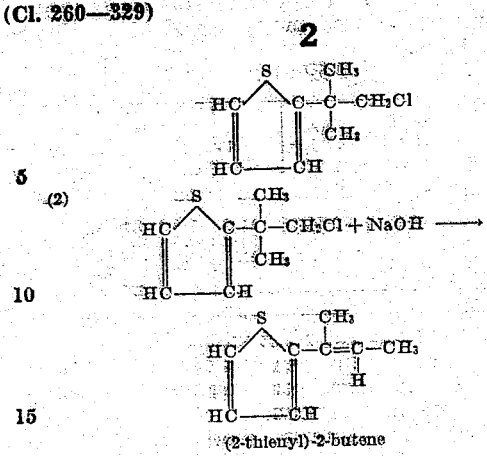

Thus (2-thienyl)-2-butene is produced by the combination of the two steps illustrated by the above equations.

The chloroalkylation step of the process is carried out by commingling a thiophene, a halo-olefin and a suitable catalyst such as boron trifluoride-ethylether, an alkane sulfonic acid, etc. at a temperature of from about —20° to about 100° C. and at a pressure of from substantially atmospheric to about 100 atmospheres for a time of from about 0.1 to about 10 hours to produce a chloroalkylated thiophene. The resultant chloroalkylated thiophene is then separated from unconverted starting materials and by-products of the reaction after which it is reacted in a sealed autoclave with an aqueous alkaline solution such as an aqueous solution containing from about 1 to about 35% by weight of sodium hydroxide at a temperature of from about 100° to about 300° C. under pressure for a time of from about 0.5 to about 8 hours to effect dehydrochlorination and the production of a thiophene containing an alkenyl substituent.

The nature of the present invention and the type of results obtained thereby are illustrated further by the following examples which should not be misconstrued to impose undue limitations upon the generally broad scope of the invention.

EXAMPLE I 226 grams of thiophene (2.7 moles) and 226 grams of methallyl chloride (2.5 moles) were placed in a glass reactor of one liter capacity and 68 grams of a boron trifluoride-ethylether catalyst was added thereto with stirring. The reaction mixture was maintained at a temperature of 80° C. for a time of 2.7 hours after which the reaction products were subjected to washing and separation treatments to recover chloroalkylated thiophenes from unconverted starting materials. By this process, monochloro- and dichlorotertiarybutylthiophenes were obtained in the respective yields of 47 and 9% based upon the weight of methallyl chloride which reacted in the process.

A portion of the resultant chlorotertiarybutylthiophene which may also be referred to as 2-methyl-2-thienylchloropropane was reacted with an aqueous solution of sodium hydroxide. In this treatment, 17.5 grams of the chlorotertiarybutylthiophene and 125 cc. of an aqueous solution containing 5% by weight of sodium hydroxide were placed in a glass-lined rotating autoclave of 850 cc. capacity and maintained at a temperature of 200° for a time of 4 hours. The resultant reaction products were then washed, dried, and distilled, to separate fractions with the boiling ranges and properties given in the following table.

Table I

| Fraction Number | Flask Temperature, °C. | Vapor Temperature, °C. | At mm. Hg | Distillate | | |
|---|---|---|---|---|---|---|
| | | | | cc. | gr. | $n_D^{20}$ |
| V-1 | 81-84 | 70-75.5 | 11.5 | 1.8 | 1.8 | 1.5500 |
| V-2 | -85 | 76.3 | 11.5 | 2.7 | 2.8 | 1.5650 |
| V-3 | -92 | 77 | 11.5 | 5.0 | 4.9 | 1.5672 |
| V-4 | -145 | 77 | 11.5 | 0.8 | 0.8 | 1.5671 |
| V-botts | | | | | 1.1 | |

Fraction V-3 did not react with sodium, gave a negative test for halogen but reacted immediately with potassium permanganate solution thus indicating unsaturation.

Analysis of this material showed it to have the composition expected for (2-thienyl)-2-butene. The analysis was:

Calcd. for $C_8H_{10}S$: C, 69.57; H, 7.25; S, 23.19.
Found: C, 69.06; H, 7.56; S, 23.54.

EXAMPLE II

The chloroalkylation of thiophene was also catalyzed by ethane sulfonic acid as shown by the following experimental results:

25 grams of thiophene (0.3 mole) and 13.5 grams (0.15 mole) of methallyl chloride were reacted in the presence of 4.4 grams of ethane sulfonic acid at a temperature of 73° C. for a time of 2 hours. About 50% of the methallyl chloride was recovered unchanged together with about a 50% yield of monochlorotertiarybutylthiophene.

EXAMPLE III 82 grams of bromothiophene (0.5 mole) and 0.25 mole of methallyl chloride were reacted in the presence of 15 grams of a boron fluoride-ethylether catalyst at a temperature of 66° C. for a time of 2 hours. About 80% of the methallyl chloride was recovered unchanged. 5-chloro-t-butyl-2-bromothiophene was recovered in a yield of about 60% based upon the weight of methallyl chloride which reacted.

We claim as our invention:

1. A process for producing (2-thienyl)-2-butene which comprises reacting chlorotertiarybutylthiophene with an alkali to effect dehydrochlorination.

2. A process for producing (2-thienyl)-2-butene which comprises reacting chlorotertiarybutylthiophene with sodium hydroxide solution and recovering the resultant (2-thienyl)-2-butene.

3. A process for producing (2-thienyl)-2-butene which comprises reacting chlorotertiarybutylthiophene with an aqueous alkaline solution containing from about 1% to about 35% by weight of sodium hydroxide at a temperature of from about 100° to about 300° C. under pressure for a time of from about 0.5 to about 8 hours.

4. A process for producing (2-thienyl)-2-butene which comprises reacting chlorotertiarybutylthiophene with an alkali at a temperature of from about 100° to about 300° C. to effect dehydrochlorination.

5. A process for producing (2-thienyl)-2-butene which comprises reacting chlorotertiarybutylthiophene with sodium hydroxide solution at a temperature of from about 100° to about 300° C. and recovering the resultant (2-thienyl)-2-butene.

HERMAN PINES.
BRUNO KVETINSKAS.

References Cited in the file of this patent

UNITED STATES PATENTS

| Number | Name | Date |
|---|---|---|
| 2,141,611 | Malishev | Dec. 27, 1938 |
| 2,492,663 | Schick | Dec. 27, 1949 |
| 2,556,419 | Emerson | June 12, 1951 |

OTHER REFERENCES

Weygand, Organic Preparations, pp. 316-317, Interscience Publ., New York, 1945.